(12) United States Patent
Durantay

(10) Patent No.: US 9,379,587 B2
(45) Date of Patent: Jun. 28, 2016

(54) COIL FOR A ROTATING ELECTRICAL MACHINE

(75) Inventor: Lionel Durantay, Frouard (FR)

(73) Assignee: GE Energy Power Conversion Technology Ltd., Warwickshire (GB)

( * ) Notice: Subject to any disclaimer, the term of this patent is extended or adjusted under 35 U.S.C. 154(b) by 621 days.

(21) Appl. No.: 12/798,683

(22) Filed: Apr. 9, 2010

(65) Prior Publication Data
US 2010/0264761 A1    Oct. 21, 2010

(30) Foreign Application Priority Data
Apr. 9, 2009    (FR) ..................................... 09 52338

(51) Int. Cl.
| | |
|---|---|
| *H02K 3/24* | (2006.01) |
| *H02K 3/34* | (2006.01) |
| *H02K 9/00* | (2006.01) |
| *H02K 15/04* | (2006.01) |
| *H02K 3/30* | (2006.01) |
| *H02K 15/10* | (2006.01) |

(52) U.S. Cl.
CPC .. *H02K 3/30* (2013.01); *H02K 3/24* (2013.01); *H02K 15/105* (2013.01); *H02K 9/005* (2013.01); *Y10T 29/49009* (2015.01)

(58) Field of Classification Search
CPC ........... H02K 3/24; H02K 9/005; H02K 9/00; H02K 3/30; H02K 15/005; Y10T 29/49009
USPC .............. 310/55, 56, 90.5, 203, 208, 215, 45; 29/596
IPC ............................ H02K 3/24, 3/34, 9/00, 15/04
See application file for complete search history.

(56) References Cited

U.S. PATENT DOCUMENTS

| | | | | |
|---|---|---|---|---|
| 4,626,754 | A | * | 12/1986 | Habermann et al. ........... 318/460 |
| 4,833,354 | A | * | 5/1989 | Miller .............................. 310/87 |
| 5,393,929 | A | * | 2/1995 | Yagihashi ............... B32B 27/08 174/102 R |
| 5,755,288 | A | * | 5/1998 | Bearden et al. ................ 166/370 |
| 6,404,092 | B1 | * | 6/2002 | Baumann ............... H02K 15/12 310/201 |

(Continued)

FOREIGN PATENT DOCUMENTS

| | | |
|---|---|---|
| DE | 102 27 559 A1 | 10/2003 |
| EP | 0 413 179 A | 2/1991 |

(Continued)

OTHER PUBLICATIONS

Ishikawa et al, English translation of JP 02-250206, 1990.*

*Primary Examiner* — John K Kim
(74) *Attorney, Agent, or Firm* — Wood IP LLC

(57) ABSTRACT

A gas treatment machine includes a main gas treatment circuit, connected to a gas compression chamber, a gas compressor, mounted in the compression chamber, a rotating electrical machine, for driving the gas compressor, including at least one coil for the flow of electric current for generating a magnetic flux, and a secondary cooling circuit, transporting gas from the compression chamber to the rotating electrical machine, for cooling this rotating electrical machine. The coil includes at least one toroidal core formed from a rolling of a plurality of turns (20) each consisting of at least one conductor (22) insulated over the length thereof by a primary insulator (24), the rolling which forms the toroidal core in turn being covered with a secondary insulator (26), the primary insulator (24) and the secondary insulator (26) including PolyEtherEtherKetone.

10 Claims, 3 Drawing Sheets

(56) References Cited

U.S. PATENT DOCUMENTS

| | | | |
|---|---|---|---|
| 6,727,617 B2* | 4/2004 | McMullen et al. | 310/90.5 |
| 7,701,106 B2* | 4/2010 | Yuratich | E21B 43/128 310/214 |
| 8,183,734 B2* | 5/2012 | Saban | H02K 1/02 310/179 |
| 8,672,641 B2* | 3/2014 | Yuratich | E21B 43/128 417/44.1 |
| 2002/0079763 A1* | 6/2002 | Fleshman et al. | 310/87 |
| 2006/0175064 A1* | 8/2006 | Yuratich | E21B 43/128 166/381 |
| 2007/0252449 A1* | 11/2007 | Ikeda | H01B 3/40 310/45 |
| 2008/0284264 A1* | 11/2008 | Yuratich | E21B 43/128 310/87 |
| 2008/0284268 A1* | 11/2008 | Yuratich et al. | 310/156.09 |
| 2009/0091202 A1* | 4/2009 | Parmeter et al. | 310/87 |
| 2009/0096313 A1* | 4/2009 | Harada | H02K 3/522 310/201 |
| 2009/0180910 A1* | 7/2009 | Shiibayashi et al. | 418/55.1 |
| 2010/0019590 A1* | 1/2010 | Guedes-Pinto et al. | 310/53 |
| 2010/0019610 A1* | 1/2010 | Saban et al. | 310/198 |
| 2010/0264761 A1* | 10/2010 | Durantay | 310/55 |

FOREIGN PATENT DOCUMENTS

| | | |
|---|---|---|
| EP | 0 810 249 A | 12/1997 |
| EP | 0 951 132 A | 10/1999 |
| JP | 02250206 A  * | 10/1990 |

* cited by examiner

COIL FOR A ROTATING ELECTRICAL MACHINE

This claims the benefit of French Priority Application FR 09 52338, filed Apr. 9, 2009 and hereby incorporated by reference herein.

The present invention relates to a gas treatment machine, of the type comprising: a main gas treatment circuit, connected to a gas compression chamber, a gas compressor, mounted in the compression chamber, a rotating electrical machine, for driving the gas compressor, of the type comprising at least one coil for the flow of electric current for generating a magnetic flux, and a secondary cooling circuit, transporting gas from the compression chamber to the rotating electrical machine, for cooling said rotating electrical machine.

BACKGROUND

A machine of this type is for example intended for a gas treatment process such as the extraction, separation, storage or transport of gas, in particular of natural gas, in some cases comprising hydrogen sulphide ($H_2S$).

High-power rotating electrical machines comprise on the stator, and optionally on the rotor if this is not provided with permanent magnets, coils for the flow of electric current for generating a magnetic flux. Similarly, windings of this type are used in magnetic bearings, allowing shafts to be supported in rotation, in particular shafts of alternators, motors, compressors.

In a gas treatment machine of this type, the rotating electrical machines and the magnetic bearings are cooled by the gas used in the treatment process. The coils are therefore in contact with this gas, which in certain cases, in particular when it contains hydrogen sulphide, may be aggressive and corrosive towards these coils, in particular in a damp environment. In other words, the rotating electrical machines and magnetic bearings are located in a particularly aggressive and corrosive environment.

The coils used in these conditions are formed from a copper conductor covered with an insulator such as polyimide. The copper conductor insulated in this manner is rolled up to form a coil. These coils are shaped, and then the winding formed in this manner is covered with insulating tape, which forms a secondary insulation generally known as ground insulation. This ground insulation is generally formed from a polyimide, epoxy, polyester-mica or glass-mica tape.

The straight parts of the coils which are wrapped in this manner are polymerised, and then the coils are mounted within the structure of the rotating machine, after which this rotating machine is placed in a heat chamber where the windings are impregnated by a thermosetting material, such as epoxy, the polymerisation of this thermosetting material taking place at a temperature of approximately 110° C. to 160° C.

It has been found that over time, the corrosive environment in which the rotating electrical machines or magnetic bearings operate leads to deterioration of the coils.

SUMMARY OF THE INVENTION

It is an object of the present invention to provide a gas treatment machine in which the coils and the electrical machines comprising these coils exhibit an improved corrosion resistance when they are located in an aggressive and corrosive environment.

Embodiments of the present invention provide improved corrosion resistance, improved dielectric strength, when powered by voltage converters, and improved heat resistance, better than or equal to class H (180° C.).

For this purpose, the invention relates to a gas treatment machine of the above-mentioned type, characterised in that the coil comprises at least one toroidal core formed from a rolling of a plurality of turns each consisting of at least one conductor insulated over the length thereof by a primary insulator, the rolling which forms the toroidal core in turn being covered with a secondary insulator, the primary insulator and the secondary insulator comprising PolyEtherEtherKetone.

In fact, the inventors have found that a coil comprising primary and secondary insulators of this type exhibits a high corrosion resistance in a gas treatment machine of this type.

A gas treatment machine according to the invention may also comprise one or more of the following features, alone or in any technically feasible combinations:

the primary or secondary insulator consists of a PolyEtherEtherKetone matrix incorporating mica inclusions;

the primary insulator and the secondary insulator consist purely of PolyEtherEtherKetone;

the primary insulator has a thickness of between 0.1 mm and 0.5 mm;

the secondary insulator has a thickness of between 0.5 mm and 5 mm;

after mounting, the coil is impregnated with an organic resin such as an epoxy or polyester-imide resin;

the gas treatment machine comprises a housing for the rotating electrical machine, said housing being connected to the compression chamber;

the rotating electrical machine comprises a stator comprising a coil of which the primary insulator and the secondary insulator comprise PolyEtherEtherKetone;

the rotating electrical machine comprises at least one magnetic bearing, comprising at least one coil, of which the primary insulator and the secondary insulator comprise PolyEtherEtherKetone.

The invention further relates to a process for manufacturing a gas treatment machine of the type disclosed above, characterised in that it comprises a step, for manufacturing a coil, consisting of:

rolling a conductor, coated with a primary insulator comprising PolyEtherEtherKetone, into the form of a plurality of turns to form a toroidal core; and covering the toroidal core of turns formed in this manner with a secondary insulator comprising PolyEtherEtherKetone.

In particular embodiments, the process comprises one or more of the following features:

the process comprises a step of curing the PolyEtherEtherKetone of the primary insulator and the secondary insulator by raising the temperature of the toroidal core to a temperature substantially equal to 340° C.;

the process comprises a step of impregnating the coil, after mounting, with an organic resin such as an epoxy or polyester-imide resin.

BRIEF DESCRIPTION OF THE DRAWINGS

The invention will be better understood upon reading the following description, given purely by way of example and with reference to the drawings, in which.

DETAILED DESCRIPTION

Figure 5:
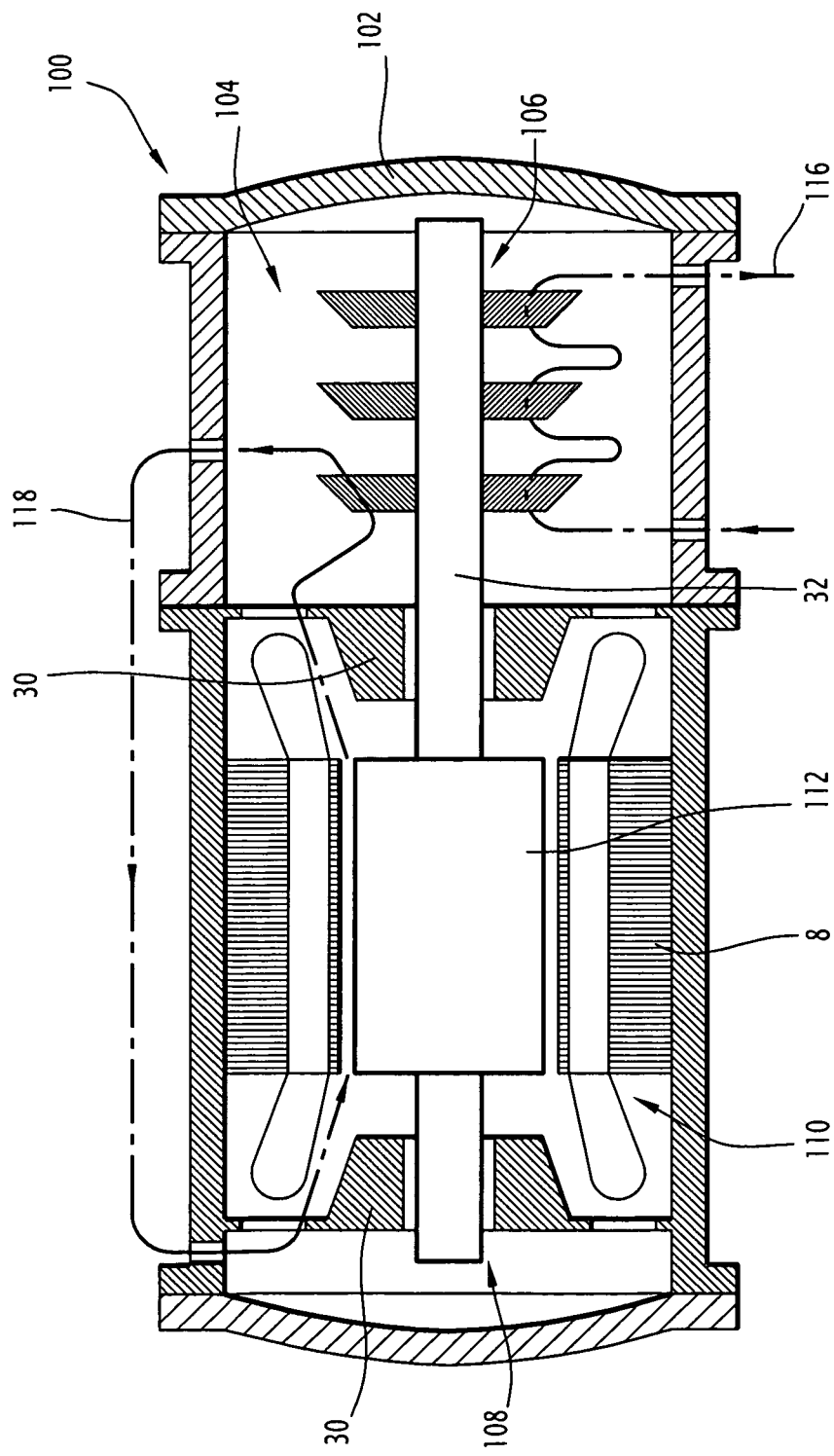
FIG. 5 is a schematic view of a gas treatment machine.

FIG. 5 shows a gas treatment machine 100 according to an example of embodiment of the invention. A machine of this type is generally known as a "motocompressor".

A gas treatment machine 100 of this type may for example be intended for the extraction, separation, storage or transport of gas, in particular of natural gas, the gas in some cases comprising hydrogen sulphide ($H_2S$).

The gas treatment machine 100 comprises an enclosure 102 delimiting a gas compression chamber 104, in which a conventional gas compressor 106 is mounted, and a housing 108 for a rotating electrical machine 110.

The gas is kept under pressure in the chamber 104, at a pressure generally greater than 10 bar, for example 80 bar.

The compression chamber 104 and the housing 108 are preferably interconnected, as shown in FIG. 5. In a variant, the compression chamber and the housing consist of a single chamber.

The rotating electrical machine 110 comprises, in a conventional manner, a stator 8, which will be described in greater detail below referring to FIG. 1, and a rotor 112, rotationally engaged with a compressor shaft 32 via which the compressor 106 is drived.

The compressor shaft 32 is supported by magnetic bearings 30 which are intended to form a magnetic field capable of holding the shaft 32 supported magnetically between these magnetic bearings 30.

A magnetic bearing 30 of this type will be described in greater detail below referring to FIG. 4.

The gas treatment machine 100 also comprises a conventional main gas treatment circuit 116, connected to the compression chamber 104.

Finally, the gas treatment machine 100 comprises a secondary cooling circuit 118, for example formed by a branch of the main circuit 116, transporting gas from the compression chamber 104 to the housing 108 containing the rotating electrical machine 110, to cool this rotating electrical machine 110 by means of the gas.

Figure 1:
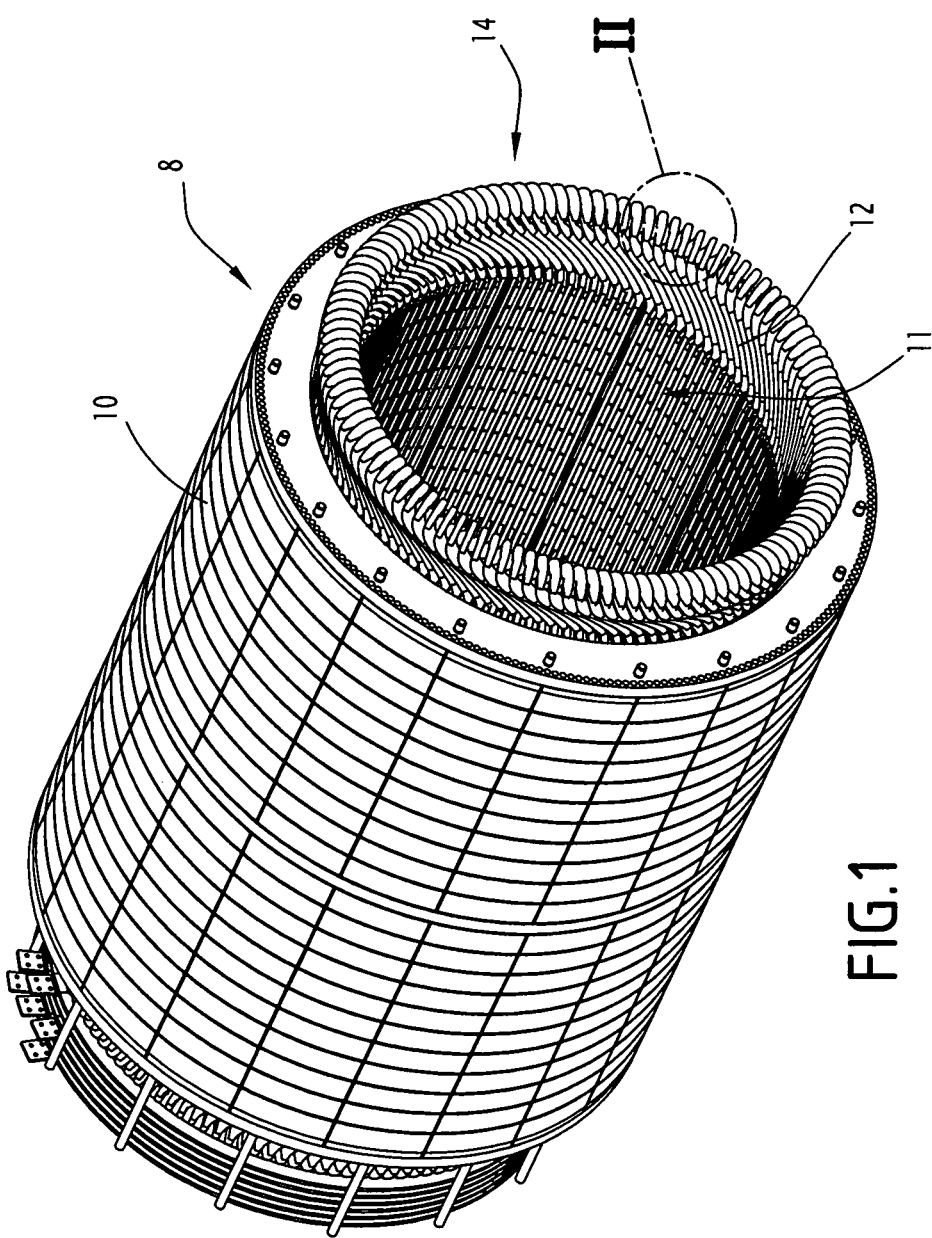
FIG. 1 is a perspective view of a stator of a rotating electrical machine.

The stator 8 shown in FIG. 1 is a stator for a rotating electrical machine 110 of high or medium power, said power for example being between 100 kW and 100 MW, preferably greater than 1 MW.

It will be noted that an electrical machine 110 of this type preferably has a rotation speed of the rotor 112 greater than 6,000 rpm.

It comprises a coil form 10, formed from a stack of plates within which longitudinal slots 11 are delimited which extend from one end of the coil form 10 to the other. Coils 12 are angularly offset and received in each of the slots 11. The coils 12 are interconnected by any suitable known means.

Figure 2:
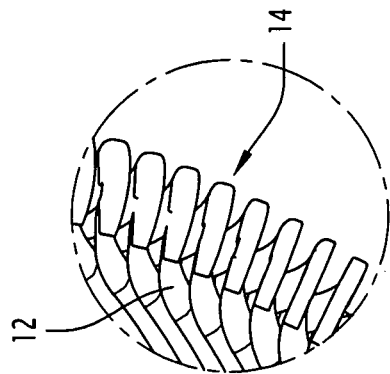
FIG. 2 is a view at a larger scale of the end windings of the stator of FIG. 1.

At the ends thereof, the coils 12 exhibit end windings 14 as shown in FIG. 2, where each coil 12 forms an elbow connecting two straight portions of the coil 12 which each extend in a slot 11 over the entire length of the coil form 10.

Each coil 12 thus forms a single toroidal core or loop, which in turn is formed from an assembly of turns 20 formed from a single conductor 22 consisting for example of copper.

Figure 3:
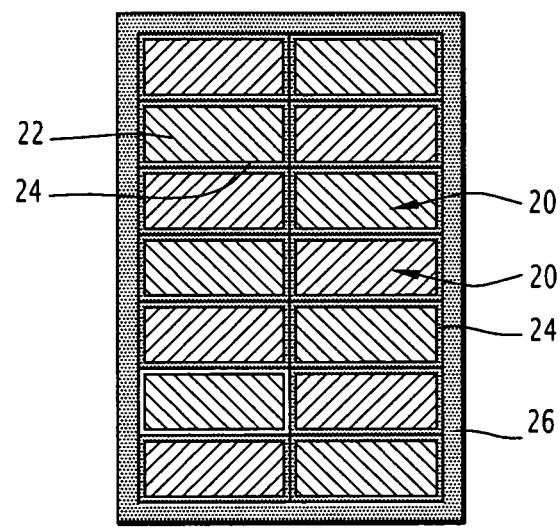
FIG. 3 is a schematic cross-section of a coil of the machine of FIGS. 1 and 2.

As shown in FIG. 3, each coil 12 comprises fourteen turns 20 of the single conductor 22. This conductor 22 is insulated by means of an external insulating coating forming a primary insulator 24. The conductor 22 preferably has a rectangular section.

The primary insulator 24 is formed from a wrapping with partial covering by a strip of material containing PolyEtherEtherKetone. PolyEtherEtherKetone is generally referred to using the acronym PEEK. This insulating material is preferably formed from PEEK.

The thickness of the primary insulator is between 0.1 mm and 0.5 mm and may for example be equal to 0.2 mm.

In an advantageous variant, the insulating material is formed from a PEEK matrix comprising mica inclusions.

The coil 12 formed in this manner from the adjacent insulated turns 20 is in turn wrapped in a secondary insulator 26 to provide ground insulation. This secondary insulation 26 is formed from a wrapping using tape comprising PEEK. Advantageously, this wrapping consists of PEEK. In a variant, the secondary insulator 26 is formed from a PEEK matrix comprising mica inclusions.

The thickness of the ground insulation is between 0.5 mm and 5 mm.

To manufacture a coil of this type, a copper strip 20 comprising a PEEK primary insulation over the entire length thereof is rolled up to form a predetermined number, for example equal to 14, of turns 22. The coil 12 formed in this manner is in turn covered with the PEEK ground insulation 26.

The primary and secondary insulations of the straight parts of the coil are polymerised by being held in a clamp and heated to a polymerisation temperature of the PEEK of approximately 340° C.

The primary and secondary insulations of the end windings 14, consisting of the curved parts of the coils, are subsequently polymerised by heating, being held in heating fixtures which make it possible to raise the temperature to approximately 340° C.

Advantageously, but optionally, the assembly thus formed is impregnated by a thermosetting material, for example an organic resin such as an epoxy or polyester-imide resin, while being kept at a temperature of approximately 170° C.

This impregnation is carried out after the coils have been positioned on the coil form of the rotor or stator of the rotating machine.

In a variant, the coil is formed from LITZ wires or from ROEBEL bars, i.e. from two half-coils, each formed from an assembly of conductors which are mutually insulated by means of PEEK. The conductors of each ROEBEL or LITZ bar are interconnected to form a coil while themselves being wrapped in a ground insulation consisting of PEEK or containing PEEK.

After the polymerisation of the PEEK, the half-coils are mounted in the coil form of the rotor or stator, and then the ends of the two half-coils are assembled to form a coil.

It has been found that rotating electrical machines formed in this manner from coils coated with an insulating material comprising PEEK, both in the primary insulation and in the ground insulation, have a high corrosion resistance, even in highly corrosive environments. Therefore, the coils of the rotating electrical machine 110 have a good service life, even though they are in contact with the treatment gas in order to be cooled, this gas being found to be corrosive in some cases, in particular when it comprises hydrogen sulphide ($H_2S$).

In a variant, when the coils formed in this manner from conductive turns have a primary insulation comprising PEEK, the turns thus formed, which are themselves covered with a ground insulation comprising PEEK, are advantageously used in the magnetic bearings 30 to form the magnetic field capable of holding the rotation shaft of the magnetic bearing supported magnetically between the different coils.

Figure 4:
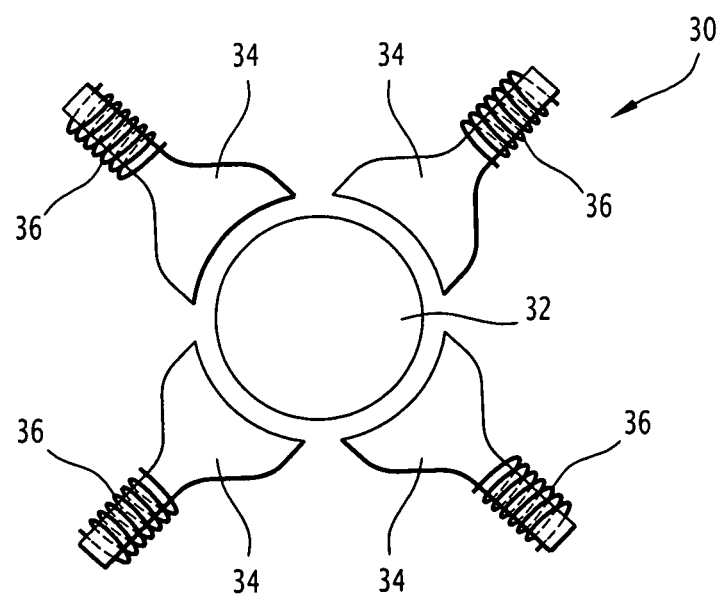
FIG. 4 is a schematic view of a magnetic bearing.

A bearing 30 of this type is shown in FIG. 4, in which 32 represents a rotation shaft. The bearing 30 comprises four magnetic glides between which the shaft 32 is held floating. Each glide comprises a magnetic core 34 which widens in the region of the shaft and a coil 36 as defined above.

It will be noted that the invention is not restricted to the embodiment described above, and could exhibit numerous variations without departing from the scope of the claims.

What is claimed is:

1. A gas treatment machine, comprising:
a gas compression chamber;
a main gas treatment circuit connected to the gas compression chamber, the main gas treatment circuit having a main inlet into the gas compression chamber, and a main outlet from the gas compression chamber;
a gas compressor mounted in the compression chamber; and
a rotating electrical machine for driving the gas compressor, the rotating electrical machine including a stator comprising a plurality of coils,
each coil being formed from a stack of plates and comprising end windings an each including an elbow connecting two straight portions of the coil each straight portion extending in a slot and each coil (i) being formed of a plurality of adjacent insulated turns of an insulated single conductor, each insulated turn of the insulated single conductor being insulated by an external insulating coating forming a primary insulator, and (ii) forming a single toroidal loop from the plurality of adjacent insulated turns, the single toroidal loop being insulated over the plurality of adjacent insulated turns with a secondary insulator, the primary and secondary insulators being formed of PolyEtherEtherKetone, wherein the coils are angularly offset and received in each slot.

2. The gas treatment machine according to claim 1, wherein at least one of the primary insulator and the secondary insulator consists of a PolyEtherEtherKetone matrix incorporating mica inclusions.

3. The gas treatment machine according to claim 1, wherein the primary insulator and the secondary insulator consist purely of PolyEtherEtherKetone.

4. The gas treatment machine according to claim 1, wherein the primary insulator has a thickness of between 0.1 mm and 0.5 mm.

5. The gas treatment machine according to claim 1, wherein the secondary insulator has a thickness of between 0.5 mm and 5 mm.

6. The gas treatment machine according to claim 4, wherein the secondary insulator has a thickness of between 0.5 mm and 5 mm.

7. The gas treatment machine according to claim 1, wherein the at least one coil is impregnated with an organic resin.

8. The gas treatment machine according to claim 7, wherein the organic resin is an epoxy or polyester-imide resin.

9. The gas treatment machine according to claim 1, further comprising a housing for the rotating electrical machine, said housing being connected to the compression chamber.

10. A gas treatment machine, comprising:
a gas compression chamber;
a main gas treatment circuit connected to the gas compression chamber, the main gas treatment circuit having a main inlet into the gas compression chamber, and a main outlet from the gas compression chamber;
a gas compressor mounted in the compression chamber; and
a rotating electrical machine for driving the gas compressor, the rotating electrical machine comprising a stator including
at least one coil being angularly offset and being formed from a stack of plates and comprising end windings each including an elbow connecting two straight portions of the coil each straight portion extending in a slot, and each coil (i) being formed of a plurality of adjacent insulated turns of insulated single conductor, each insulated turn of the insulated single conductor being insulated by an external insulating coating forming a primary insulator formed from a wrapping with a partial covering by a strip of a material containing PolyEtherEtherKetone, and (ii) forming a single toroidal loop from the plurality of adjacent insulated turns, the single toroidal loop being insulated over the plurality of adjacent insulated turns with a secondary insulator formed of PolyEtherEtherKetone.

\* \* \* \* \*